(12) United States Patent
Sutherland et al.

(10) Patent No.: US 8,920,901 B2
(45) Date of Patent: Dec. 30, 2014

(54) BLOW MOLDED ASSEMBLY WITH AN ATTACHMENT FASTENER PORTION, AND METHOD THEREOF

(71) Applicant: GM Global Technology Operations LLC, Detroit, MI (US)

(72) Inventors: Scott D Sutherland, Rochester, MI (US); Kevin T. Dempsey, Macomb, MI (US); Naveen K. Ravuri, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/773,979

(22) Filed: Feb. 22, 2013

(65) Prior Publication Data

US 2014/0242325 A1 Aug. 28, 2014

(51) Int. Cl.
*B29C 49/20* (2006.01)
*B32B 3/06* (2006.01)
*F16B 37/14* (2006.01)
*F16B 35/06* (2006.01)

(52) U.S. Cl.
CPC . *B32B 3/06* (2013.01); *B29C 49/20* (2013.01); *F16B 37/14* (2013.01); *F16B 35/06* (2013.01)
USPC ............... 428/99; 29/428; 428/35.7; 264/523

(58) Field of Classification Search
CPC .......... F16B 37/14; F16B 35/06; B29C 49/20
USPC ....................... 29/428; 428/99, 35.7; 264/523
See application file for complete search history.

(56) References Cited

U.S. PATENT DOCUMENTS 3,557,654 A * 1/1971 Weidner, Jr. .................. 411/396
6,998,174 B2 * 2/2006 Porter et al. ............... 428/318.8

OTHER PUBLICATIONS

Through Definition Merriam-Webster, http://www.merriam-webster.com/dictionary/through.*
Passage Definition Merriam-Webster, http://www.merriam-webster.com/dictionary/passage.*

* cited by examiner

*Primary Examiner* — Aaron Austin
*Assistant Examiner* — Jasper Saberi
(74) *Attorney, Agent, or Firm* — Quinn Law Group, PLLC

(57) ABSTRACT

A blow molded assembly includes an attachment fastener portion integrated with a plastic component portion, and is formed by a blow molding process. The attachment fastener portion has a shaft and a base, where the base has at least one aperture and a bearing surface. The shaft extends from the bearing surface. The at least one aperture is configured to allow plastic for the plastic component portion to flow sufficiently through the base during the blow molding process such that the attachment fastener portion and the plastic component portion are integrated. The base of the attachment fastener portion may be substantially embedded within the plastic component portion. The shaft of the attachment fastener portion may be configured to receive a matable fastener such that the blow molded assembly may be attached to a structure. To accomplish this, the shaft may be threaded.

9 Claims, 3 Drawing Sheets

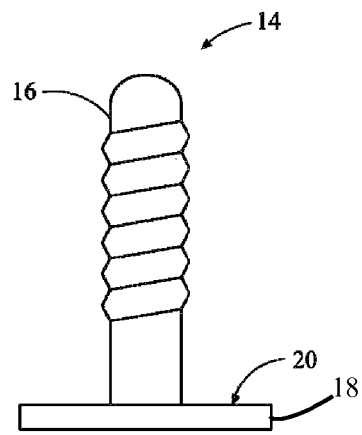
FIG. 3
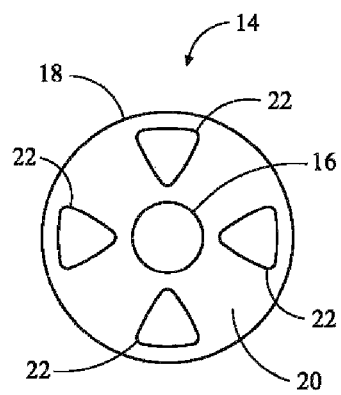 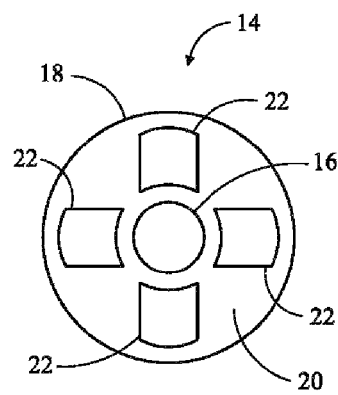 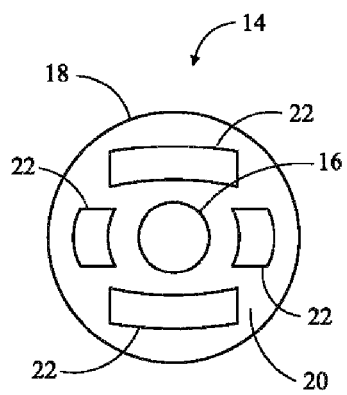
FIG. 4A  FIG. 4B  FIG. 4C

BLOW MOLDED ASSEMBLY WITH AN ATTACHMENT FASTENER PORTION, AND METHOD THEREOF

TECHNICAL FIELD

The present invention relates to a blow molded assembly having an attachment fastener portion integrated with a plastic component portion, and a method thereof.

BACKGROUND

Blow molding is a manufacturing process to form hollow plastic parts, and is commonly used in such industries as the automotive industry to form parts, including, but not limited to, a spoiler for a vehicle. Oftentimes, the part formed from blow molding is to be attached to a structure. For example, in the automotive industry, the spoiler is attached to the rear of the vehicle. As such, an attachment mechanism or device is necessary to attach the part to the structure. One mechanism currently employed to accomplish this is the use of a T-stud or other fastener, generally having a base and a shaft. The fastener(s) is attached to the plastic part such that the plastic part surrounds a portion of the base around its circumference or perimeter. The plastic part, in turn, is aligned with the structure having pre-defined hole(s) in which the fastener(s) are inserted. On the other side of the structure, a matable fastener(s), such as a nut, is mated with the fastener(s) to secure the part to the structure.

SUMMARY

A blow molded assembly formed from a blow molding process is provided. The blow molded assembly includes an attachment fastener portion and a plastic component portion. The attachment fastener portion includes a base having a bearing surface and forming at least one aperture. The at least one aperture is configured to allow molten plastic for the plastic component portion to flow sufficiently through the base during the blow molding process such that the attachment fastener portion and the plastic component portion are integrated with each other. The base of the attachment fastener portion may be substantially embedded within the plastic component portion to increase the strength of the blow molded assembly.

The attachment fastener portion also includes a shaft that extends from the bearing surface of the base. The shaft may be welded to the base. The shaft may be configured to receive a matable fastener such that the blow molded assembly may be attached to a structure, such as a vehicle. To accomplish this, the shaft may be threaded.

A method of forming the blow molded assembly described above is further provided. The method first includes positioning at least one attachment fastener portion, as described above, on a mold. The mold has a cavity that defines a particular shape. The method then includes inserting the plastic component portion into the mold. The method then includes forming the plastic component into the shape of the cavity via a blow molding process. During the blow molding process, molten plastic for the plastic component portion flows sufficiently through the at least one aperture in the base of the at least one attachment fastener portion, thereby integrating the at least one attachment fastener portion and the plastic component portion after the blow molding process is complete. As explained above, the base of the attachment fastener portion may be substantially embedded within the plastic component portion.

The method may further include forming the at least one attachment fastener portion prior to positioning it on the mold. This may include punching the at least one aperture in the base. This may also include welding the shaft to the base.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic, front view of the attachment fastener portion of FIG. 1;

FIGS. 4A, 4B, and 4C are schematic, plan views of the attachment fastener of FIG. 3 according to three embodiments;

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
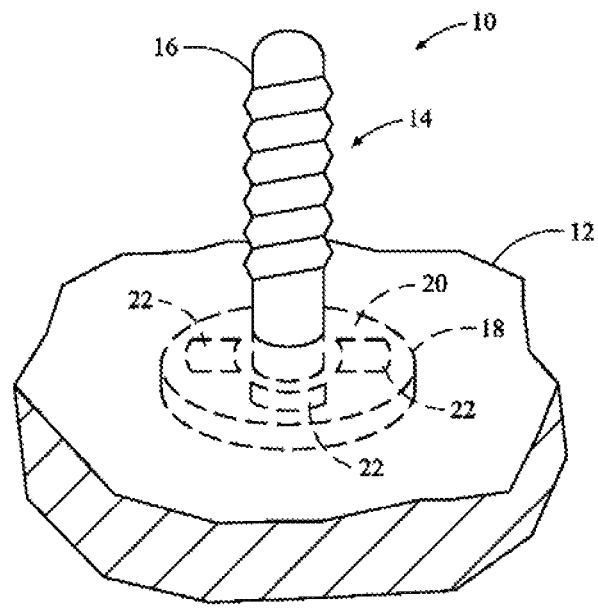
FIG. 1 is a schematic, fragmentary perspective view of a blow molded assembly including an attachment fastener portion integrated with a plastic component portion.
Figure 5:
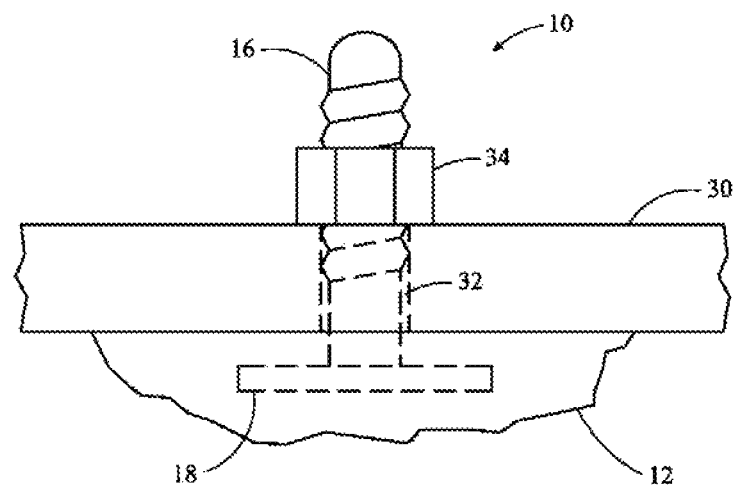
FIG. 5 is a schematic, fragmentary front view of the blow molded assembly of FIG. 1 attached to a structure.

Referring to the drawings, wherein like reference numbers correspond to like or similar components wherever possible throughout the several figures, a fragmentary, perspective view of a blow molded assembly 10 is shown in FIG. 1. The blow molded assembly 10 is formed by a blow molding process, as described in method 100 hereinafter. The blow molded assembly 10 may be attached to a structure 30 as part of a larger assembly, as depicted in FIG. 5 and described in more detail hereinafter. The structure 30 may be, but is not limited to, a vehicle.

Figure 2:
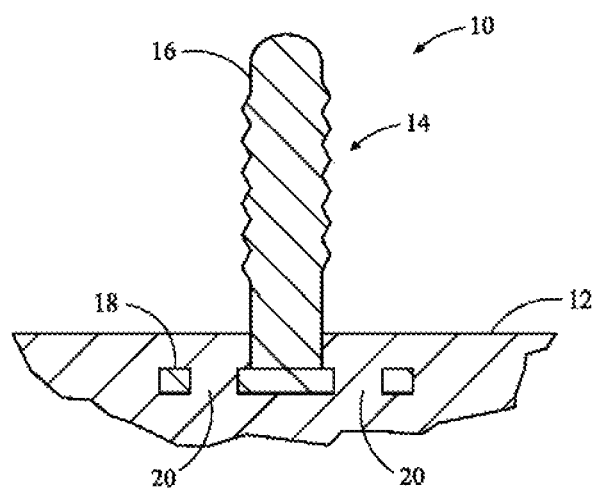
FIG. 2 is a schematic, fragmentary cross-sectional view of the blow molded assembly of FIG. 1.
Figure 7:
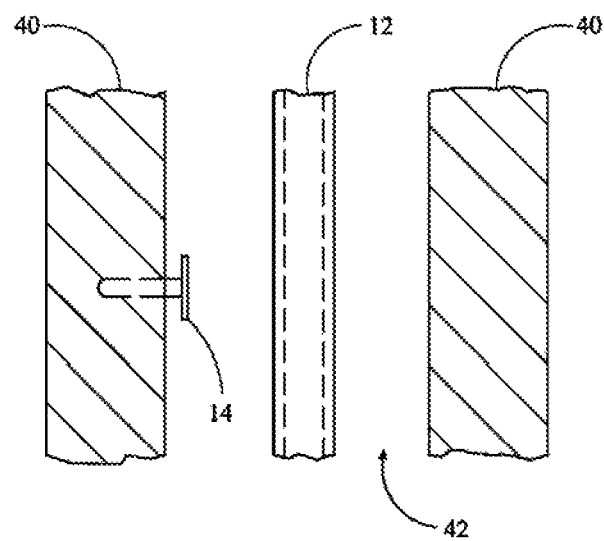
FIG. 7 is a schematic, fragmentary front view, partly in section, of a blow mold setup for forming the blow molded assembly of FIG. 1.

The blow molded assembly 10 includes an attachment fastener portion 14 integrated with a plastic component portion 12, the integration of which is achieved during the blow molding process. The material of the plastic component portion 12 generally may be any thermoplastic used in a blow molding process. For example, the material may be, but is not limited to, acrylonitrile butadiene styrene (ABS). The plastic component portion 12, in its perform shape prior to the blow molding process is generally a hollow tube, as depicted in FIG. 7 and explained in more detail hereinafter. Through the blow molding process, the plastic component 12 is formed into its final shape, as indicated in FIG. 2.

Referring now to FIG. 3, the attachment fastener portion 14 generally includes a shaft 16 and a base 18. The base 18 has a bearing surface 20 from which the shaft 16 extends longitudinally. The shaft 16 and the base 18 may be made of steel, or any other material with similar, or superior, material properties, such as hardness, tensile strength, torsional strength, and the like. The shaft 16 and the base 18 further may be coated in a finishing material (not shown), including, but not limited to, zinc phosphate. The shaft 16 may be welded to the base 18. Alternatively, the shaft 16 and the base 18 may be cold formed.

The base 18 includes apertures 22. The apertures 22 may be any size and shape that may fit on the base 18 around the shaft 16. FIGS. 4A, 4B, and 4C depict plan views of three different embodiments of the attachment fastener portion 14 where the apertures 22 may be of different sizes and shapes. While four apertures 22 are shown, it should be appreciated that the base 18 may include any number of apertures 22. Furthermore, while the base 18 is shown as circular, it should be appreciated that the base 18 may be any regular or irregular geometric shape, including, but not limited to, a rectangle, a hexagon, and the like.

The apertures 22 are configured to allow molten plastic for the plastic component portion 12, as it is being formed into its final shape during the blow molding process, to flow sufficiently through the base 18 such that the plastic component portion 12 and the attachment fastener portion 14 are integrated with each other. The apertures 22 may be configured in a pattern and sized such that the base 18 is substantially embedded within the plastic component portion 12, as depicted in FIG. 2. As such, the blow mold assembly 10 may absorb a greater applied torque and other forces than if the plastic component portion 12 surrounded only a portion of the base 18 around its circumference or perimeter.

The shaft 16 may be configured to interact with a structure 30 and a matable fastener 34 such that the blow mold assembly 10 may be attached to the structure 30, such as a vehicle, as depicted in FIG. 5 and explained above. The structure 30 generally may have a hole 32 through which the shaft 16 may penetrate from one side of the structure 30. On the other side of the structure 30, the matable fastener 34 may connect with the shaft 16 to provide a secure connection to the structure 30. The matable fastener 34 may be, but is not limited to, a nut. The shaft 16 may be threaded to allow for it to mate with the matable fastener 34. The length of the shaft 16 may vary depending on the structure 30 through which it extends.

Figure 6:
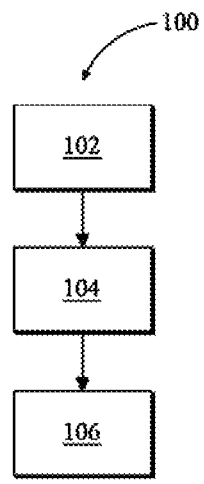
FIG. 6 is a schematic, flow diagram of an exemplary method of forming the blow molded assembly of FIG. 1.

Referring to FIG. 6, a method 100 for forming the blow molded assembly 10 is shown. Method 100 begins at step 102 in which at least one attachment fastener portion 14 is positioned on a mold 40, as depicted in the blow mold setup in FIG. 7. The mold 40 has a cavity 42 defining the final shape of the plastic component portion 12.

After step 102, method 100 proceeds to step 104. At step 104, the plastic component portion 12, in its preform shape (FIG. 7), is inserted into the mold 40. As explained above, the preform shape of the plastic component portion 12 generally is a hollow tube.

After step 104, method 100 proceeds to step 106. At step 106, the plastic component portion 12 is formed into the configured shape of the cavity 42 via a blow molding process. During the blow molding process, plastic for the plastic component portion 12 flows through the at least one aperture 22 in the base 18 of the at least one attachment fastener portion 14, thereby integrating the plastic component portion 12 and the at least one attachment fastener portion 14 with each other. As explained above and shown in FIG. 2, the base 18 may be substantially embedded within the plastic component portion 12 after the blow molding process.

Prior to step 102, method 100 may include forming the at least one attachment fastener portion 14. This may include sub-steps in which the at least one aperture 22 is punched in the base 18, and/or the shaft 16 is welded to the base 18. These sub-steps may be performed in any order.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An assembly, comprising:
an attachment fastener portion and a plastic component portion, the attachment fastener portion integrated with the plastic component portion and having:
a base including a base body, the base body having a first surface and a second surface opposite the first surface, the base defining at least one aperture extending through the base body such that the at least one aperture extends from the first surface to the second surface; and
a shaft extending from the first surface;
wherein at least part of the plastic component portion extends through the at least one aperture.

2. The assembly of claim 1, wherein the base defines a third surface extending from the second surface to the first surface along a first direction, and the at least one aperture extends through the base body along the first direction, the shaft extends from the first surface along the first direction, the first and second surfaces extends along a second direction, and the second direction is substantially perpendicular to the first direction.

3. The assembly of claim 2, wherein the at least one aperture is a plurality of apertures disposed around the shaft.

4. The assembly of claim 1 wherein the base and the shaft are made of steel.

5. The assembly of claim 1 wherein the shaft is welded to the base.

6. The assembly of claim 1 wherein the shaft is configured to receive a matable fastener such that the assembly is securable to a structure.

7. The assembly of claim 6 wherein at least a portion of the shaft is threaded.

8. The assembly of claim 1 wherein the base of the attachment fastener portion is substantially embedded within the plastic component portion.

9. The assembly of claim 1 wherein the plastic component portion is made of acrylonitrile butadiene styrene (ABS).

* * * * *